US012563311B2

(12) United States Patent
Kim

(10) Patent No.: US 12,563,311 B2
(45) Date of Patent: Feb. 24, 2026

(54) IMAGE PROCESSING DEVICE AND IMAGE PROCESSING METHOD USING SUPER RESOLUTION NETWORK

(71) Applicant: SK hynix Inc., Icheon-si (KR)

(72) Inventor: Dong Ik Kim, Icheon-si (KR)

(73) Assignee: SK hynic Inc., Icheon-si (KR)

( * ) Notice: Subject to any disclaimer, the term of this patent is extended or adjusted under 35 U.S.C. 154(b) by 336 days.

(21) Appl. No.: 18/302,537

(22) Filed: Apr. 18, 2023

(65) Prior Publication Data

US 2024/0171871 A1 May 23, 2024

(30) Foreign Application Priority Data

Nov. 18, 2022 (KR) ........................ 10-2022-0155623

(51) Int. Cl.
*H04N 25/40* (2023.01)
*H04N 25/46* (2023.01)
*H04N 25/704* (2023.01)

(52) U.S. Cl.
CPC ............. *H04N 25/41* (2023.01); *H04N 25/46* (2023.01); *H04N 25/704* (2023.01)

(58) Field of Classification Search
CPC ............................... H04N 25/41; H04N 25/46
See application file for complete search history.

(56) References Cited

U.S. PATENT DOCUMENTS 11,375,150 B1 * 6/2022 Wang .................. H04N 25/778
2020/0302582 A1 * 9/2020 Smirnov ............. H04N 23/741
2021/0126033 A1 4/2021 Yang et al.
2021/0166348 A1 6/2021 Na et al.
2021/0390747 A1 * 12/2021 Feng ...................... G06T 11/60

FOREIGN PATENT DOCUMENTS

WO WO-2013108656 A1 * 7/2013 .......... H04N 25/134
WO WO-2014084730 A1 * 6/2014 .......... G06T 3/0075

OTHER PUBLICATIONS

Kim, Irina, et al. "Deep image demosacing for submicron image sensors." Electronic Imaging 32 (2019): 1-12. (Year: 2019).*
Dong, Chao, et al. "Image super-resolution using deep convolutional networks." IEEE transactions on pattern analysis and machine intelligence 38.2 (2015): 295-307. (Year: 2015).*
Zomet, Assaf, and Shmuel Peleg. "Multi-sensor super-resolution." Sixth IEEE Workshop on Applications of Computer Vision, 2002. (WACV 2002). Proceedings.. IEEE, 2002. (Year: 2002).*
Han, Hao, et al. "Remote Sensing Image Classification", IEEE, 2024 (Year: 2024).*

(Continued)

*Primary Examiner* — Matthew C Bella
(74) *Attorney, Agent, or Firm* — WILLIAM PARK AND ASSOCIATES LTD.

(57) ABSTRACT

An image processing device includes a memory configured to store a super resolution network trained to output a corrected image based on an input image; and a processor configured to output a super resolution image based on a first image acquired by a first image sensor and a corrected image output from the super resolution network. The super resolution network is a model trained by using second images acquired through a second image sensor, a type of the second image sensor being different from a type of the first image sensor.

19 Claims, 17 Drawing Sheets

(56) References Cited

OTHER PUBLICATIONS

Zeng, Haijin, et al. "Inheriting Bayer's Legacy: Joint Remosaicing and Denoising for Quad Bayer Image Sensor." International Journal of Computer Vision 132.11 (2024): 4992-5013. (Year: 2024).*
"A new pixel structure for mobile image sensors", Sony Semiconductor Solutions Group, Dec. 2019, https://www.sony-semicon.co.jp/e/products/IS/mobile/2_2_ocl.html.

* cited by examiner

FIG. 3B 320
321a
321b
323a
323b
324a
324b
ML2a
ML2b
ms2a
ms2b
ps2a
ps2b
CF
PD
R
G
B 220
221
BINNING PROCESSOR
423
225
TRAINING UNIT
235
SUPER RESOLUTION NETWORK
Domain Transfer
120
121
BINNING PROCESSOR
413
125
SUPER RESOLUTION IMAGE ACQUIRER
135
SUPER RESOLUTION NETWORK
419
420
SENSING
421
410
SENSING
411

235
SUPER RESOLUTION NETWORK
225
225a
RESIDUAL IMAGE ACQUIRER
717
225b
IMAGE SUMMER
719
225c
LOSS VALUE CALCULATOR
720
225d
FILTER ADJUSTER
715
223
223a
DOWNSCALER
714
223b
UPSCALER
713
221
BINNING PROCESSOR
220

713
downscale
714
upscale
715
235
SUPER RESOLUTION NETWORK
717
719
720
LOSS VALUE

FIG. 8A

235
SUPER RESOLUTION NETWORK
Conv 1
AM 1
Conv 2
AM 2
...
Conv N
AM N
237
FILTER INFORMATION

| x1 | x2 |
|---|---|
| x3 | x4 |

840

Conv

830

831

| 0 | 0 | 0 | 0 |
|---|---|---|---|
| 0 | x1 | x2 | 0 |
| 0 | x3 | x4 | 0 |
| 0 | 0 | 0 | 0 |

*

845

| w1 | w2 | w3 |
|---|---|---|
| w4 | w5 | w6 |
| w7 | w8 | w9 |

850

851

| y1 | y2 |
|---|---|
| y3 | y4 |

$$y1=(0\times w1)+(0\times w2)+(0\times w3)+(0\times w4)+(x1\times w5)+(x2\times w6)+(0\times w7)+(x3\times w8)+(x4\times w9)$$

Figure 8C:
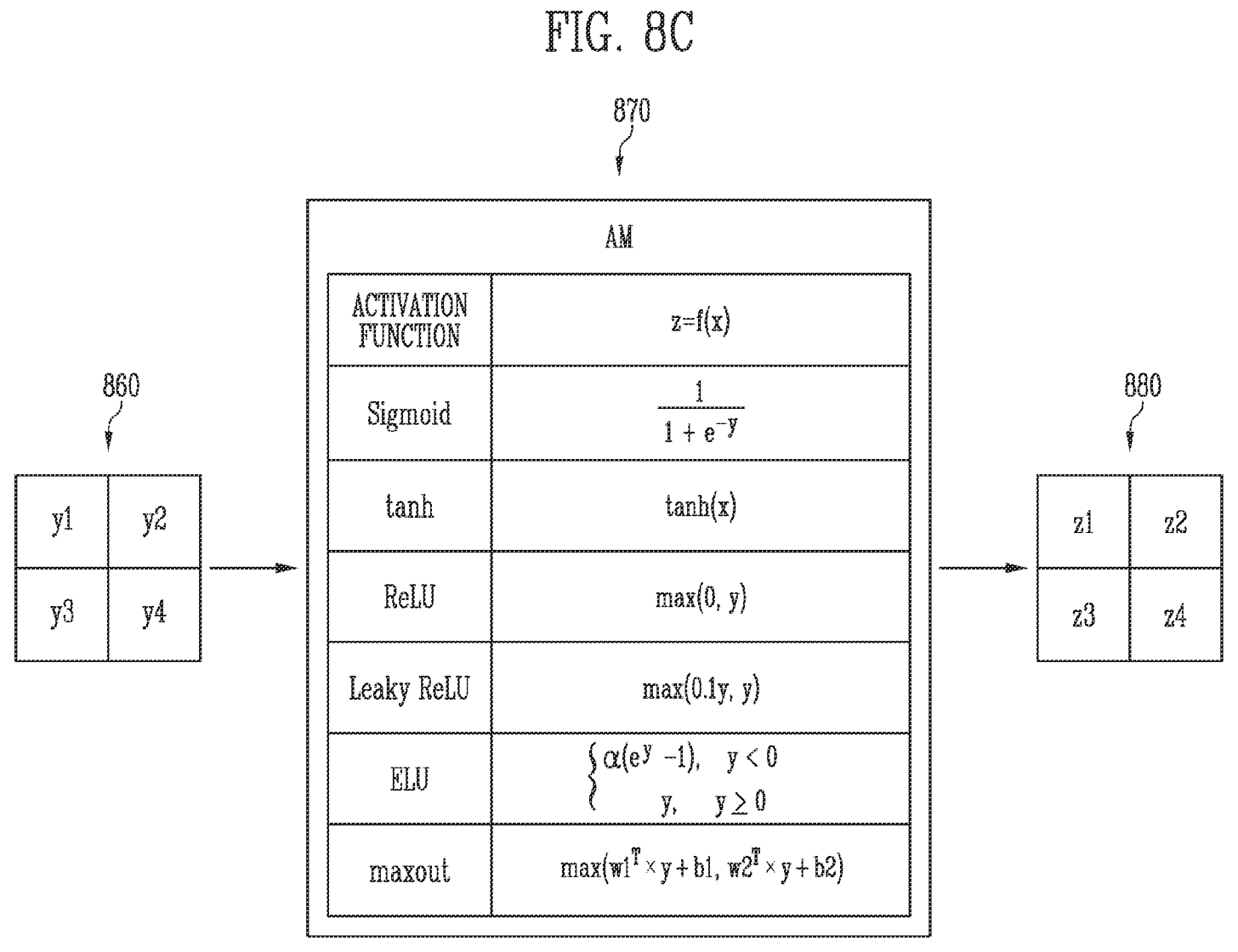

| y1 | y2 |
|---|---|
| y3 | y4 |

870

AM

| ACTIVATION FUNCTION | z=f(x) |
|---|---|
| Sigmoid | $\frac{1}{1+e^{-y}}$ |
| tanh | tanh(x) |
| ReLU | max(0, y) |
| Leaky ReLU | max(0.1y, y) |
| ELU | $\begin{cases} \alpha(e^{y}-1), & y < 0 \\ y, & y \geq 0 \end{cases}$ |
| maxout | $\max(w1^{T} \times y + b1, w2^{T} \times y + b2)$ |

880

| z1 | z2 |
|---|---|
| z3 | z4 |

FIG. 10

1013
upscale
1015
135
SUPER RESOLUTION NETWORK
1017
1019

IMAGE PROCESSING DEVICE AND IMAGE PROCESSING METHOD USING SUPER RESOLUTION NETWORK

CROSS-REFERENCE TO RELATED APPLICATION

The present application claims priority under 35 U.S.C. § 119(a) to Korean patent application number 10-2022-0155623 filed on Nov. 18, 2022, in the Korean Intellectual Property Office, the entire disclosure of which is incorporated by reference herein.

BACKGROUND

1. Technical Field

The present disclosure generally relates to an electronic device, and more particularly, to an image processing device and an image processing method, which use a super resolution network.

2. Related Art

An image sensor is a device for acquiring an image by using properties of a semiconductor. With the development of the computer industry and the communication industry, the demand for image sensors having improved performance has been increased in various fields including smartphones, digital cameras, game consoles, Internet of Things (IoT), robots, security cameras, medical micro cameras, and the like.

Recently, an image sensor having an On Chip Lens (OCL) structure in which one microlens is disposed above a plurality of pixels has been developed so as to achieve fast focusing. In the case of an image sensor having a 2×2 OCL structure in which pixels of the same color (color filter) are repeatedly arranged in 2×2, there is a problem in that a pixel value is reversed according to a phase difference, and therefore, there is a problem in that the quality of an image is deteriorated. Accordingly, an image processing technique using a new method is required with respect to image sensors having the 2×2 OCL structure, and the like.

SUMMARY

In accordance with an aspect of the present disclosure, there is provided an image processing device including: a memory configured to store a super resolution network trained to output a corrected image based on an input image; and a processor configured to output a super resolution image based on a first image acquired by a first image sensor and a corrected image output from the super resolution network, wherein the super resolution network is a model trained by using second images acquired through a second image sensor, and wherein a type of the second image sensor is different from a type of the first image sensor.

In accordance with another aspect of the present disclosure, there is provided an image processing method including: acquiring a first image through a first image sensor; and acquiring a super resolution image based on the first image through a super resolution network trained using second images acquired by a second image sensor, wherein a type of the second image sensor is different from a type of the first image sensor.

BRIEF DESCRIPTION OF THE DRAWINGS

Example embodiments will now be described more fully hereinafter with reference to the accompanying drawings;

however, they may be embodied in different forms and should not be construed as limited to the embodiments set forth herein. Rather, these embodiments are provided so that this disclosure will be thorough and complete, and will fully convey the scope of the example embodiments to those skilled in the art.

Figure 1:
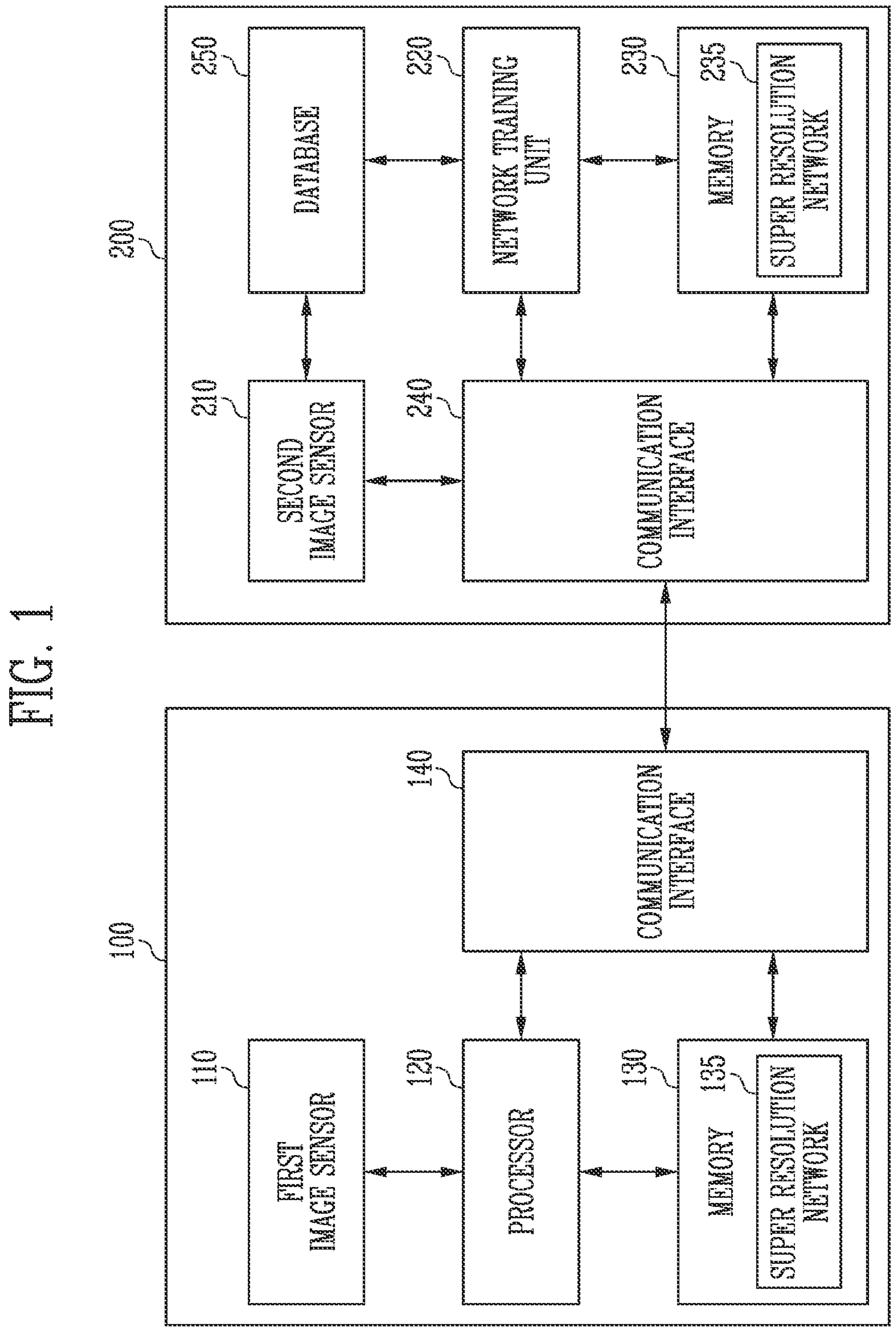

In the drawing figures, dimensions may be exaggerated for clarity of illustration. It will be understood that when an element is referred to as being "between" two elements, it can be the only element between the two elements, or one or more intervening elements may also be present. Like reference numerals refer to like elements throughout.

FIG. 1 is a diagram illustrating an image processing device and a training device in accordance with an embodiment of the present disclosure.

Figure 2:
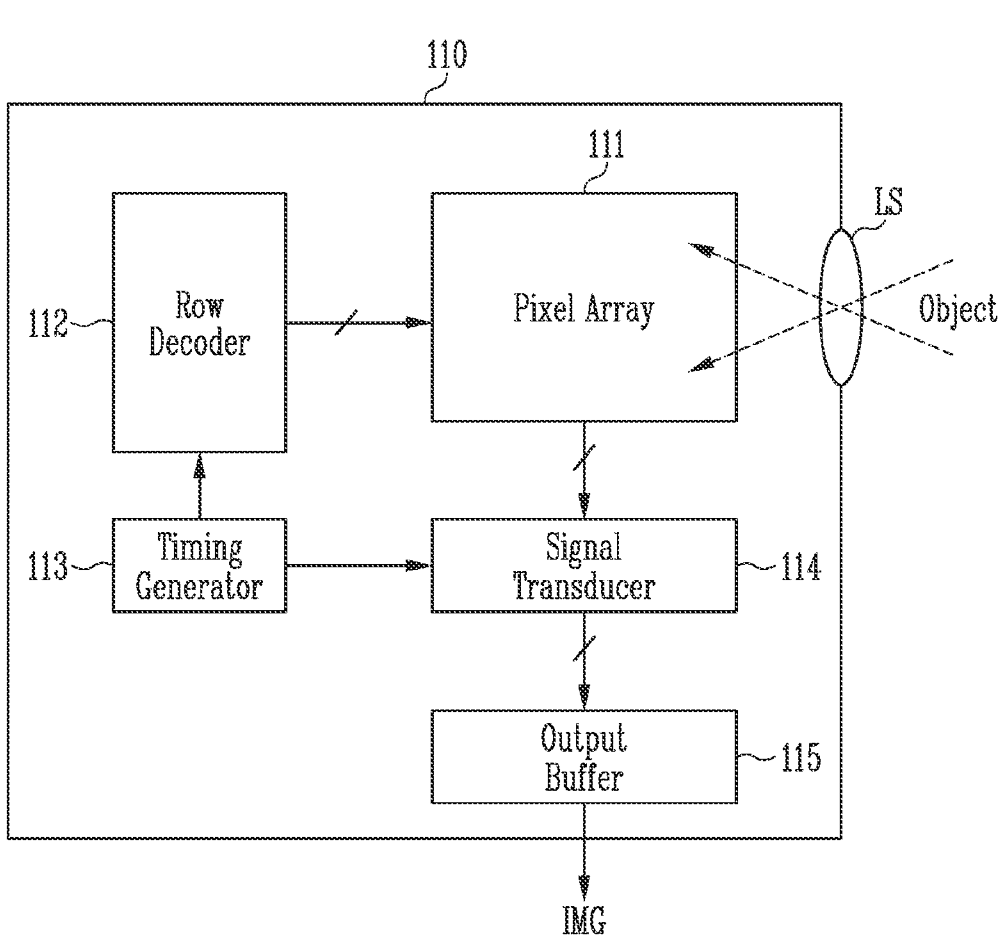

FIG. 2 is a diagram illustrating an image sensor in accordance with an embodiment of the present disclosure.

Figure 3A:
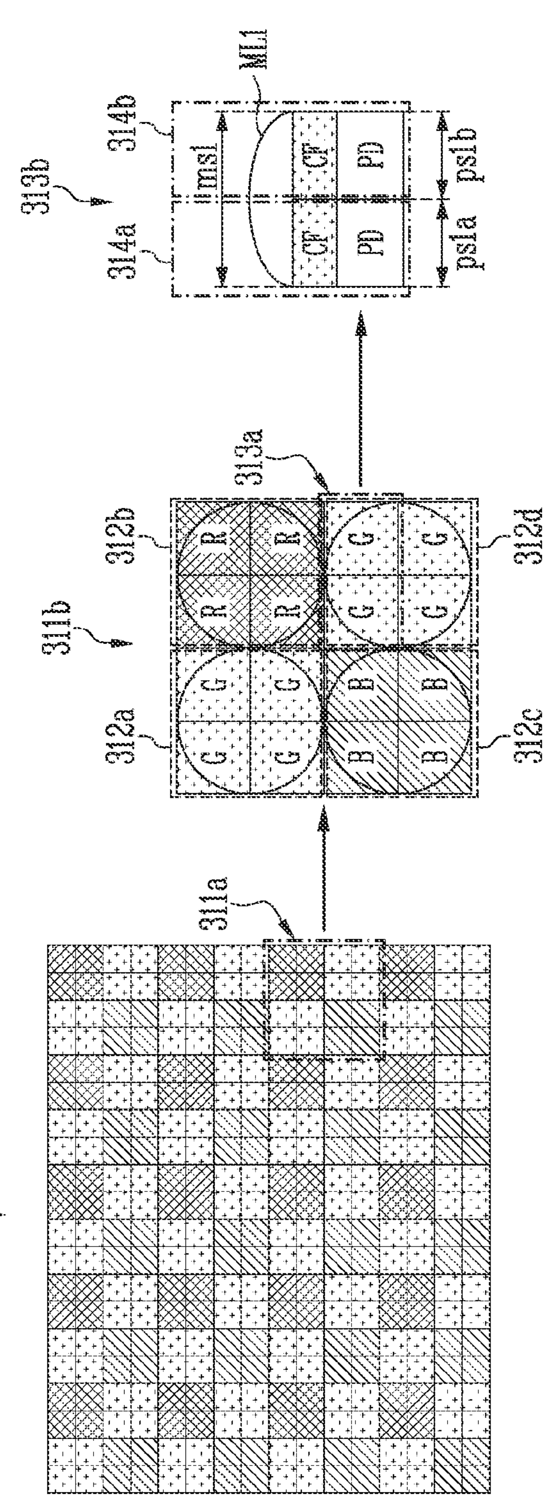

FIG. 3A is a diagram illustrating a first image sensor in accordance with an embodiment of the present disclosure.

Figure 3B:
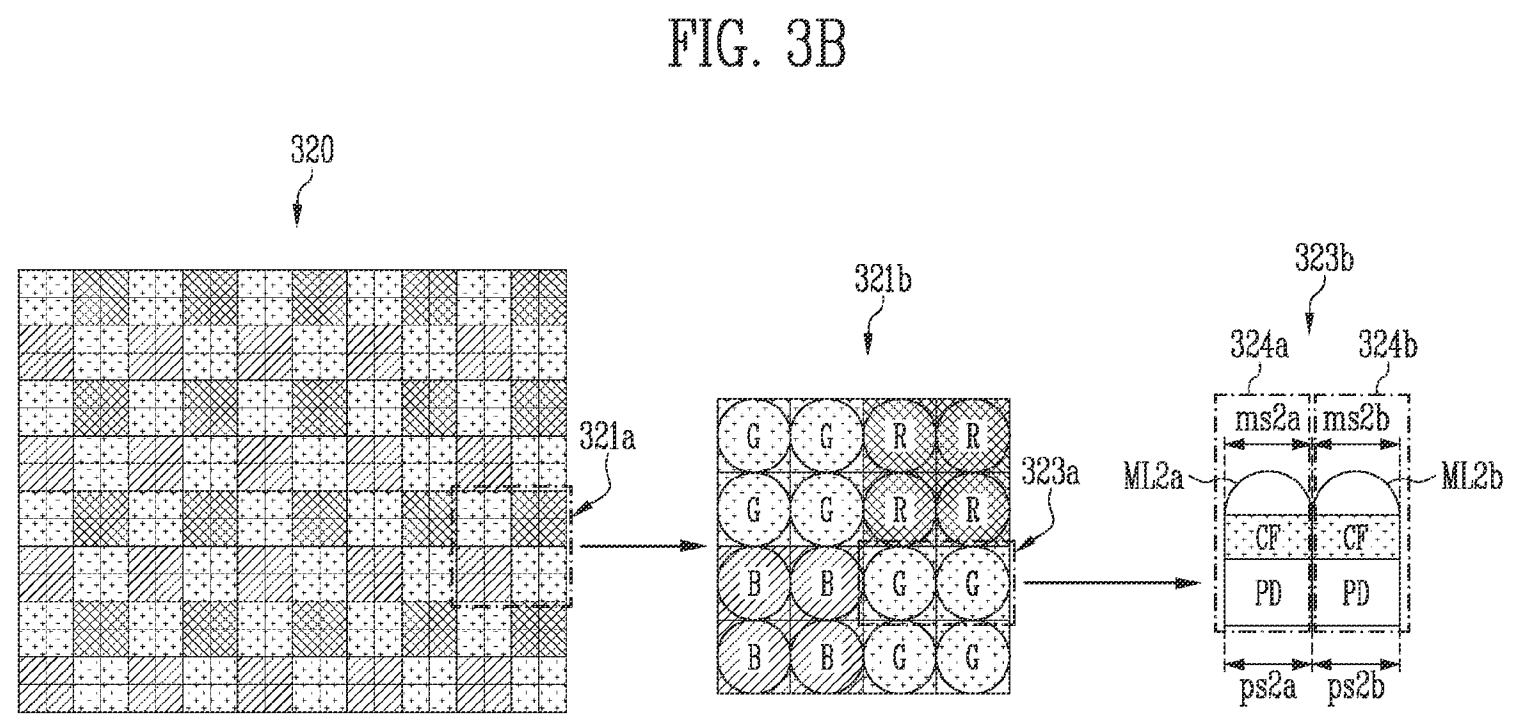

FIG. 3B is a diagram illustrating a second image sensor in accordance with an embodiment of the present disclosure.

Figure 3C:
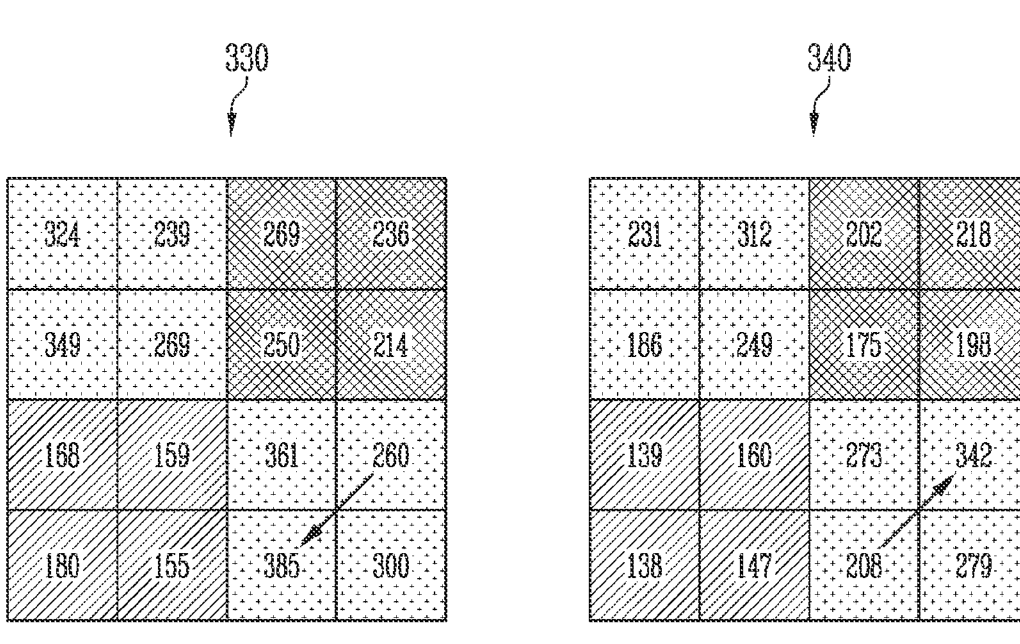

FIG. 3C is a diagram illustrating images acquired through the image sensors in accordance with an embodiment of the present disclosure.

Figure 4:
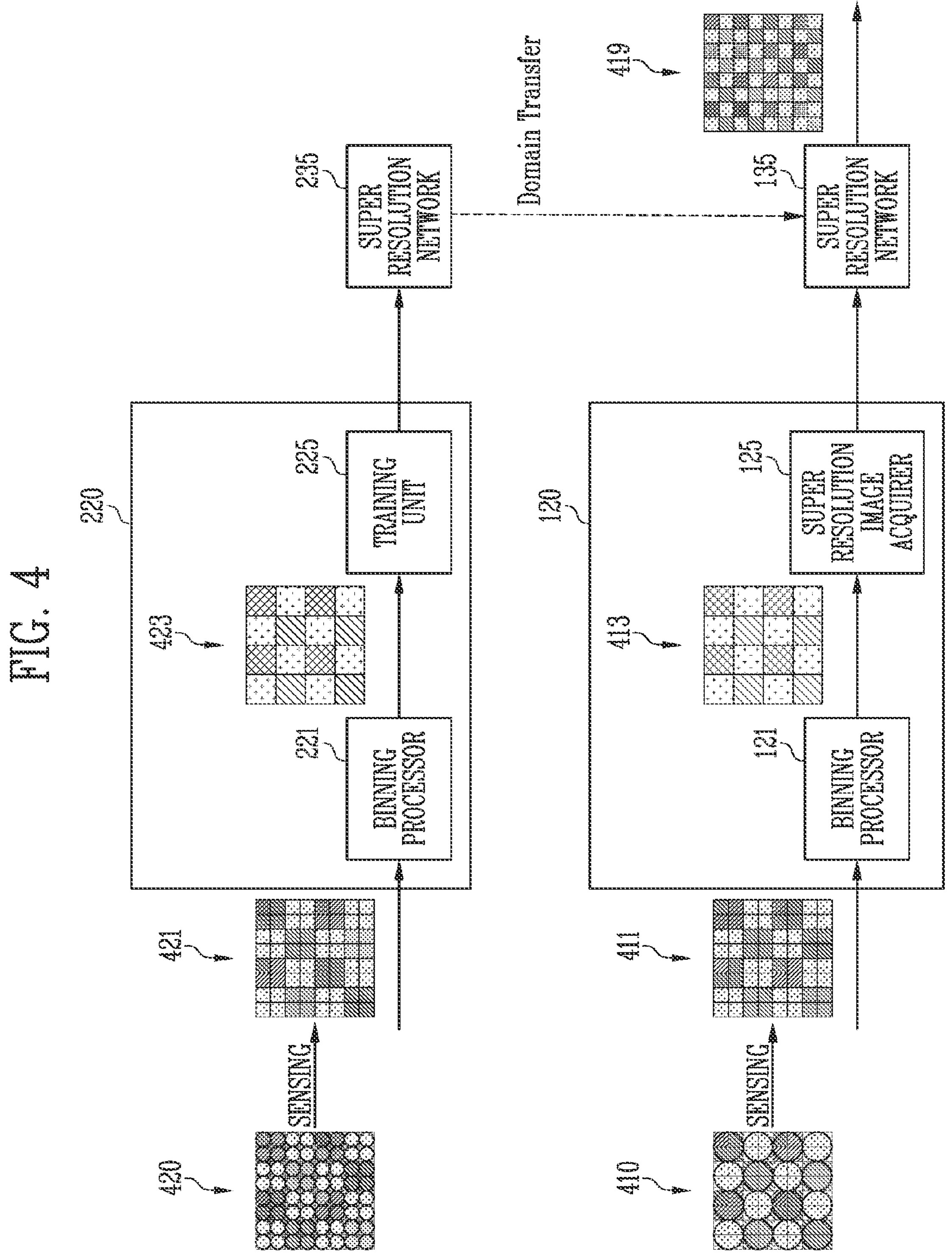

FIG. 4 is a diagram illustrating a configuration of a network training unit and a processor in accordance with an embodiment of the present disclosure.

Figure 5:
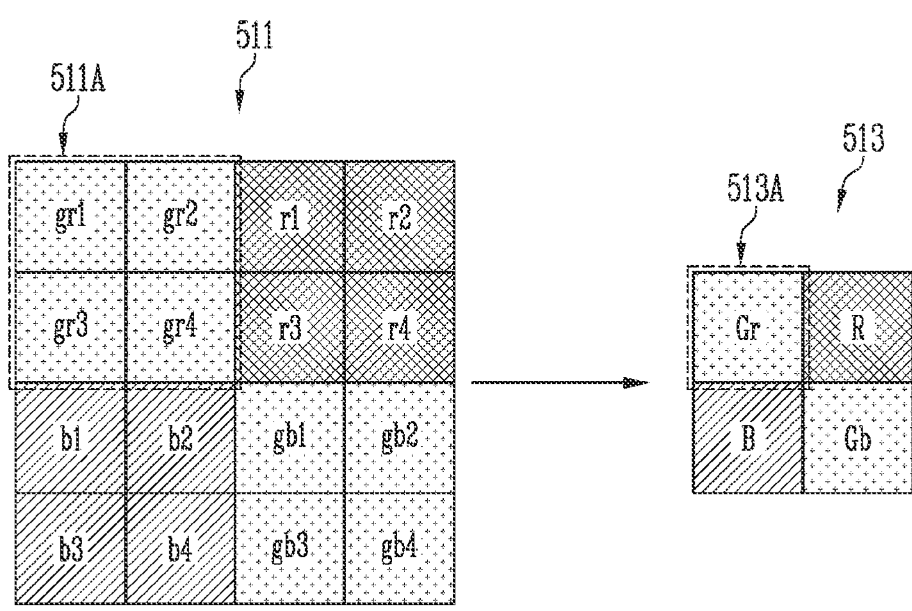

FIG. 5 is a diagram illustrating an operation of a binning processor in accordance with an embodiment of the present disclosure.

Figure 6:
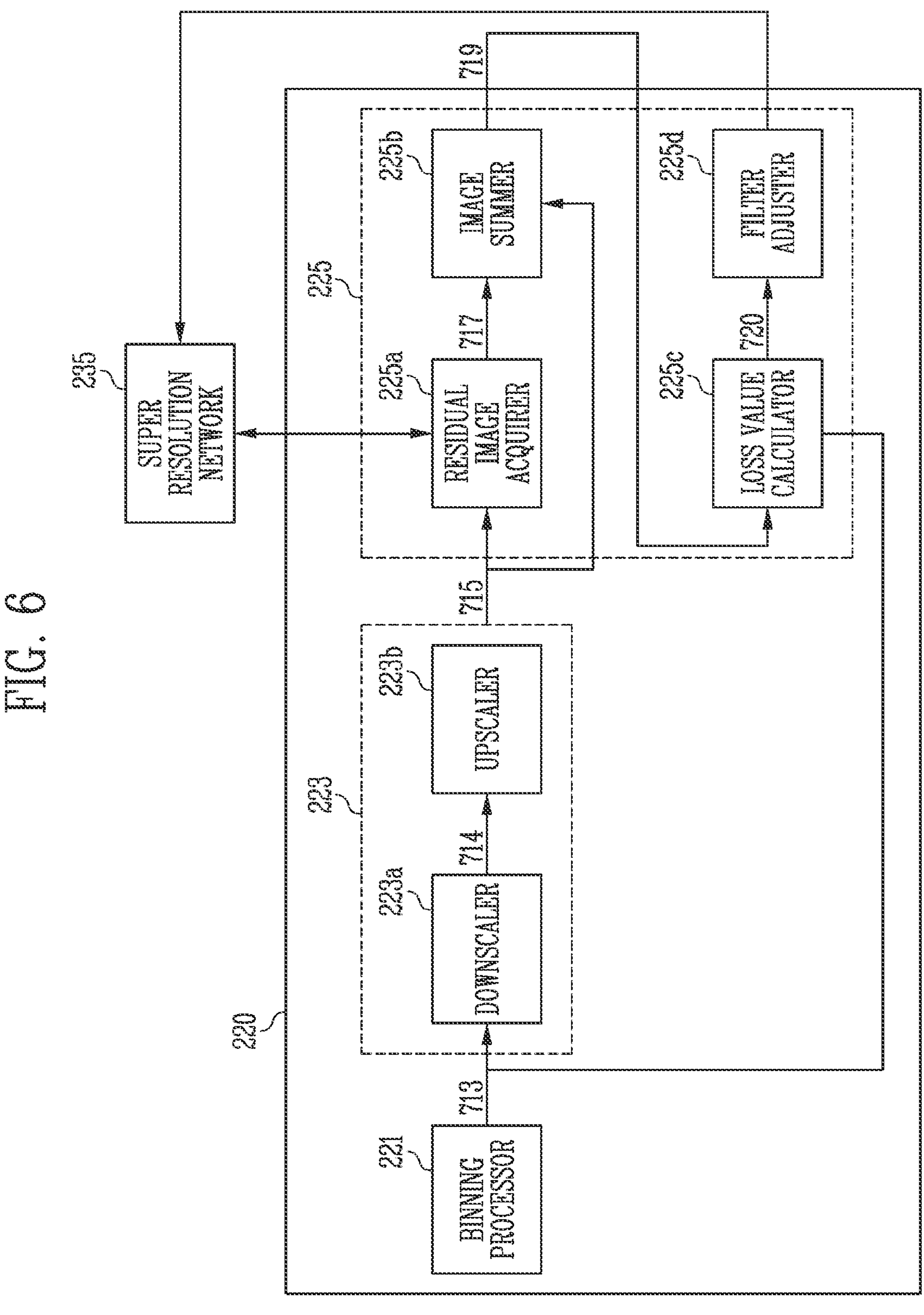

FIG. 6 is a diagram illustrating a detailed configuration of the network training unit in accordance with an embodiment of the present disclosure.

Figure 7:
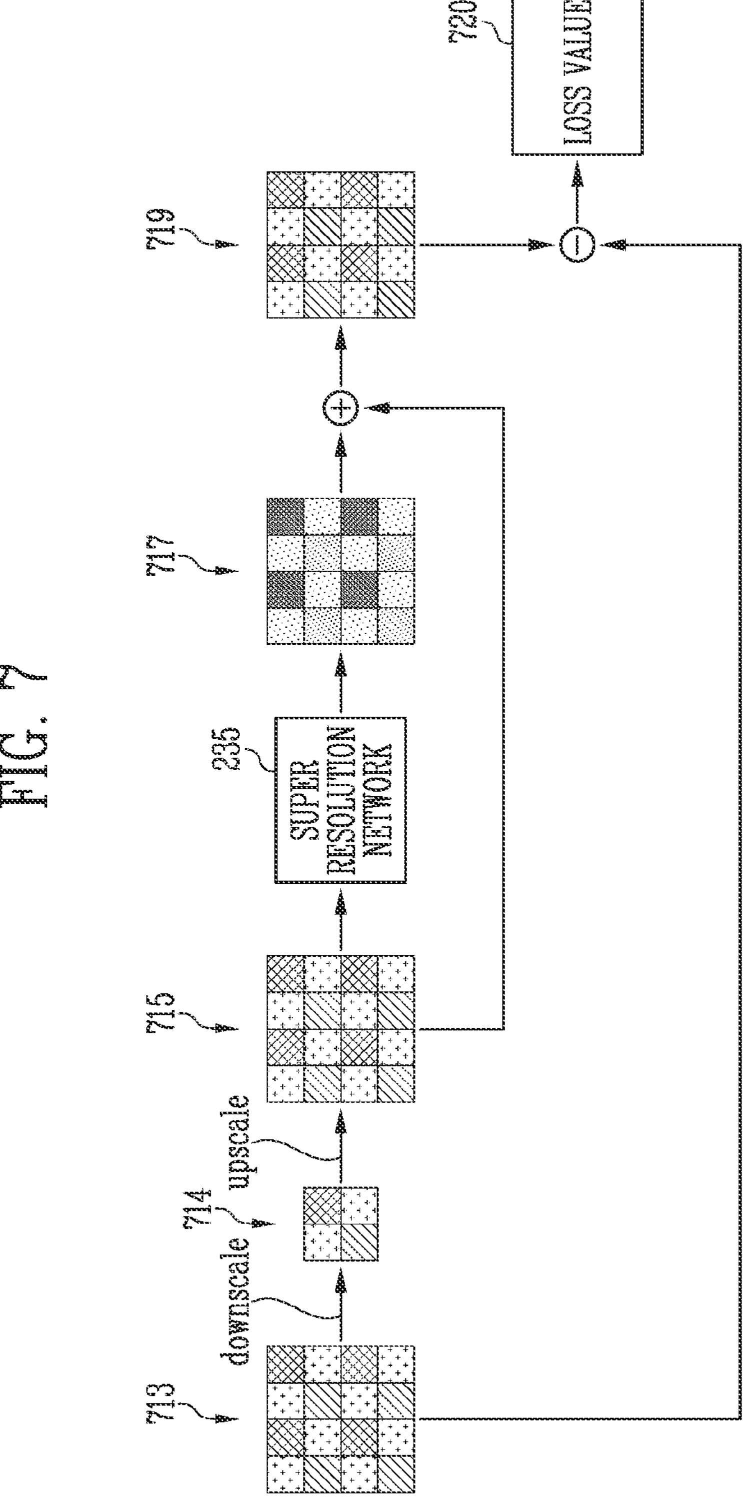

FIG. 7 is a diagram illustrating a training operation of the network training unit in accordance with an embodiment of the present disclosure.

Figure 8A:
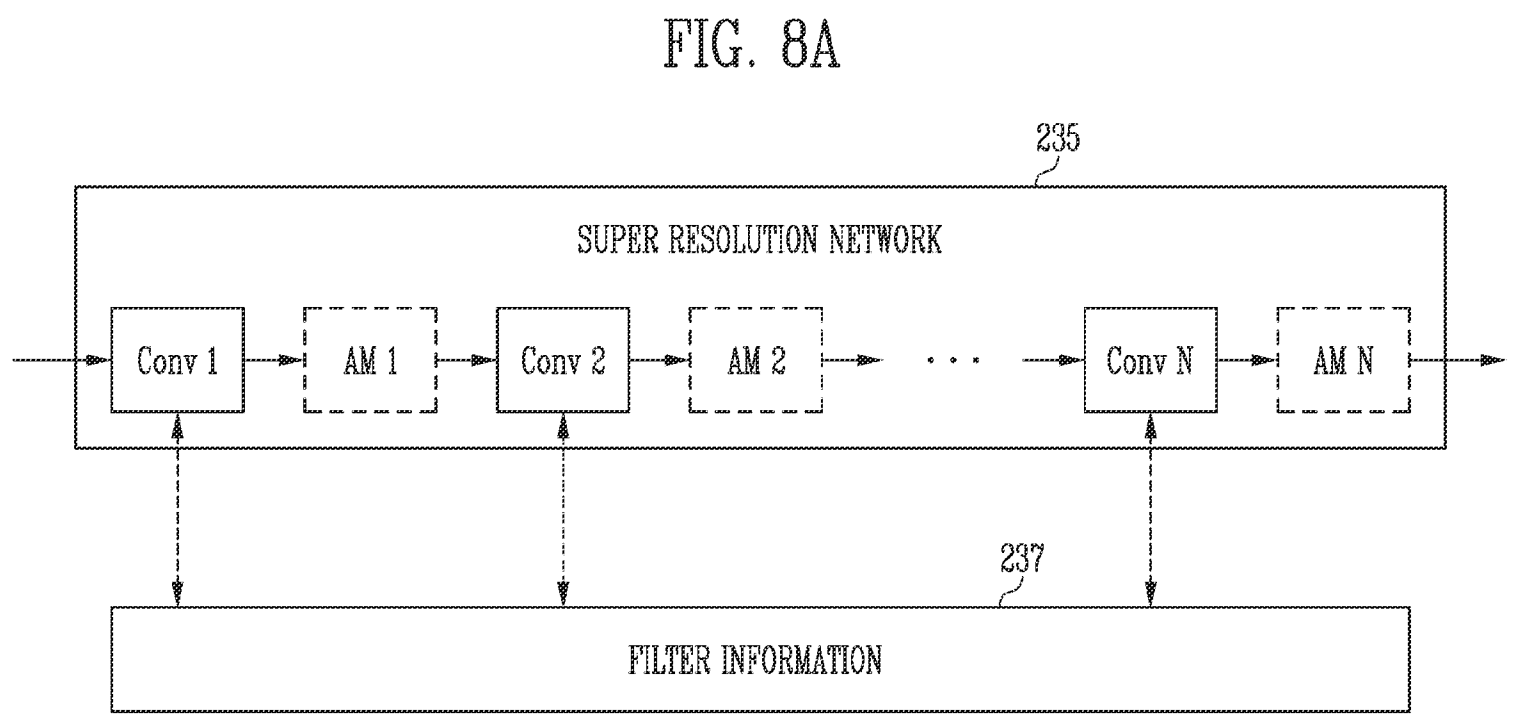

FIG. 8A is a diagram illustrating a super resolution network in accordance with an embodiment of the present disclosure.

FIG. 8B is a diagram illustrating a convolution layer in accordance with an embodiment of the present disclosure.

FIG. 8C is a diagram illustrating an activation map layer in accordance with an embodiment of the present disclosure.

Figure 9:
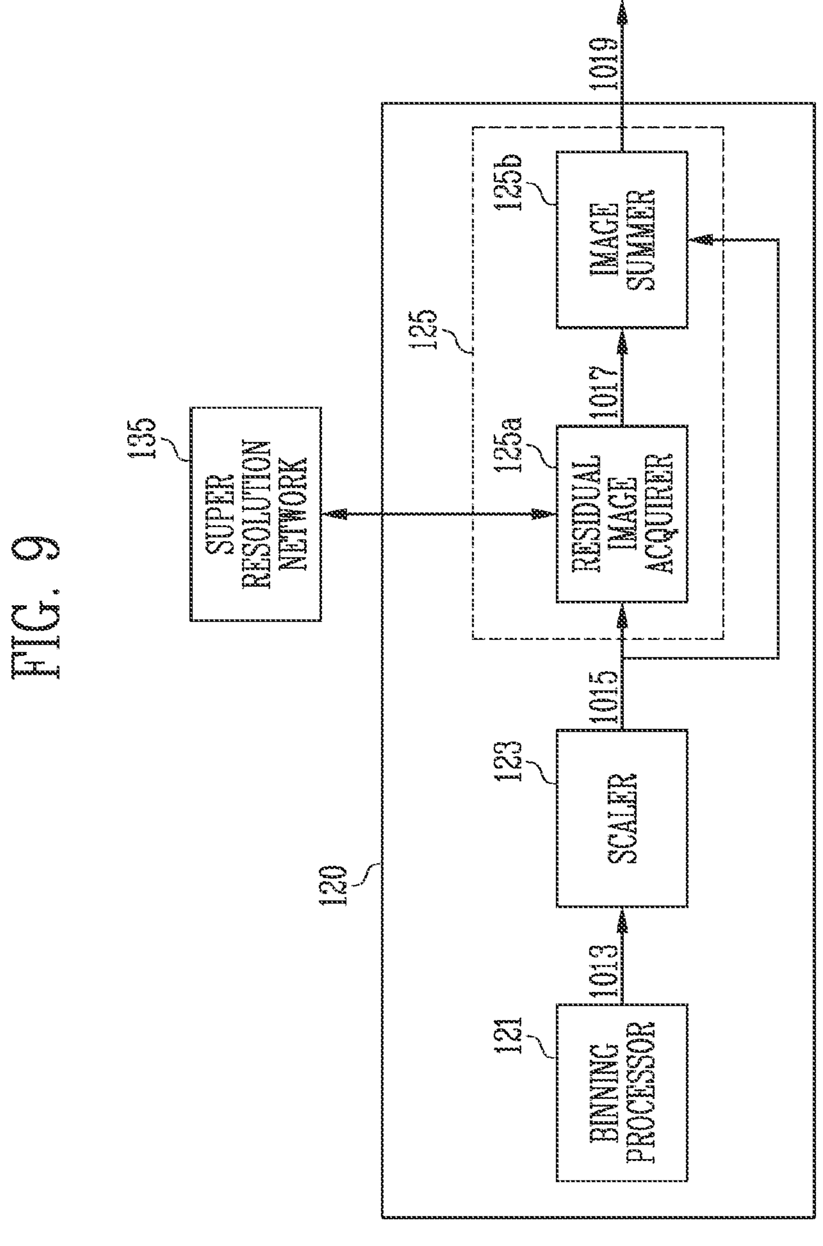

FIG. 9 is a diagram illustrating a detailed configuration of the processor in accordance with an embodiment of the present disclosure.

Figure 10:
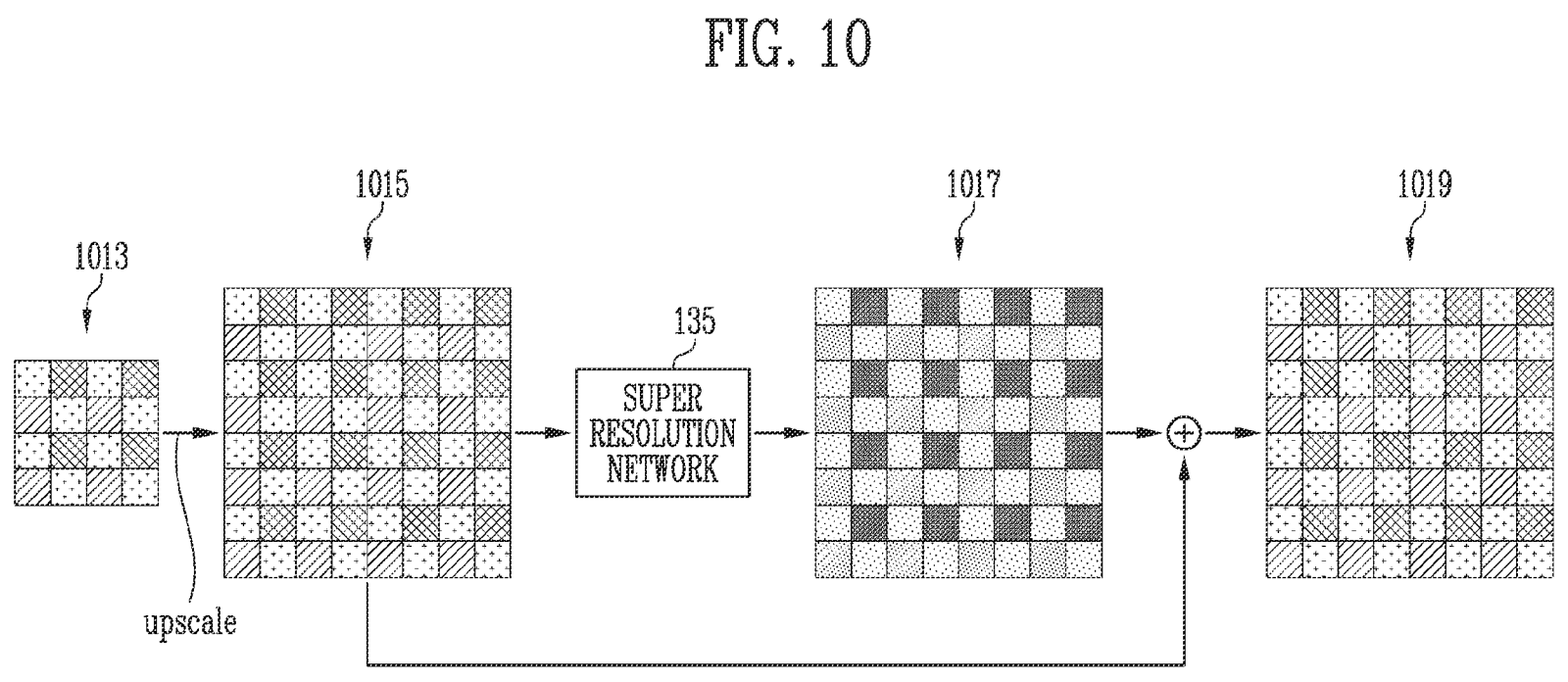

FIG. 10 is a diagram illustrating a deduction operation of the processor in accordance with an embodiment of the present disclosure.

Figure 11:
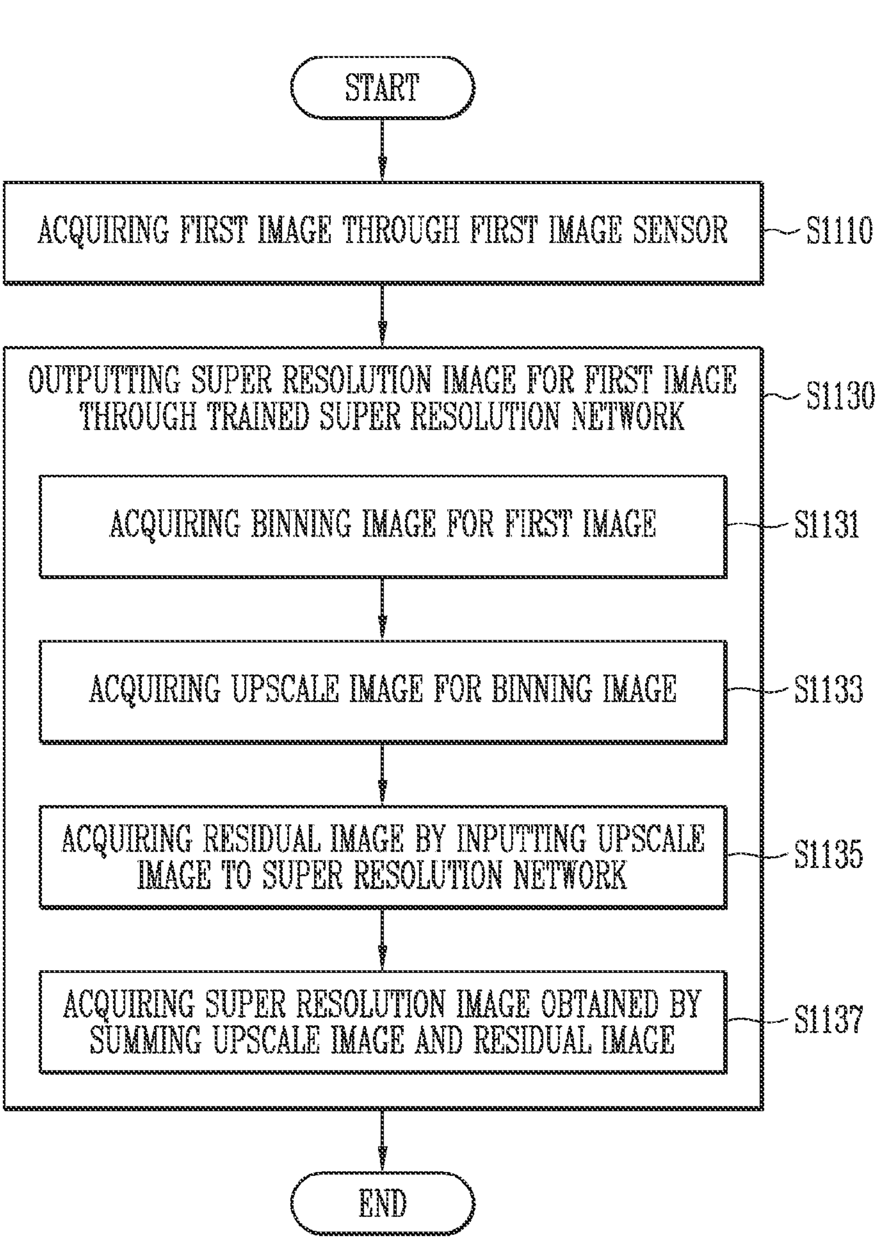

FIG. 11 is a diagram illustrating an image processing method in accordance with an embodiment of the present disclosure.

Figure 12:
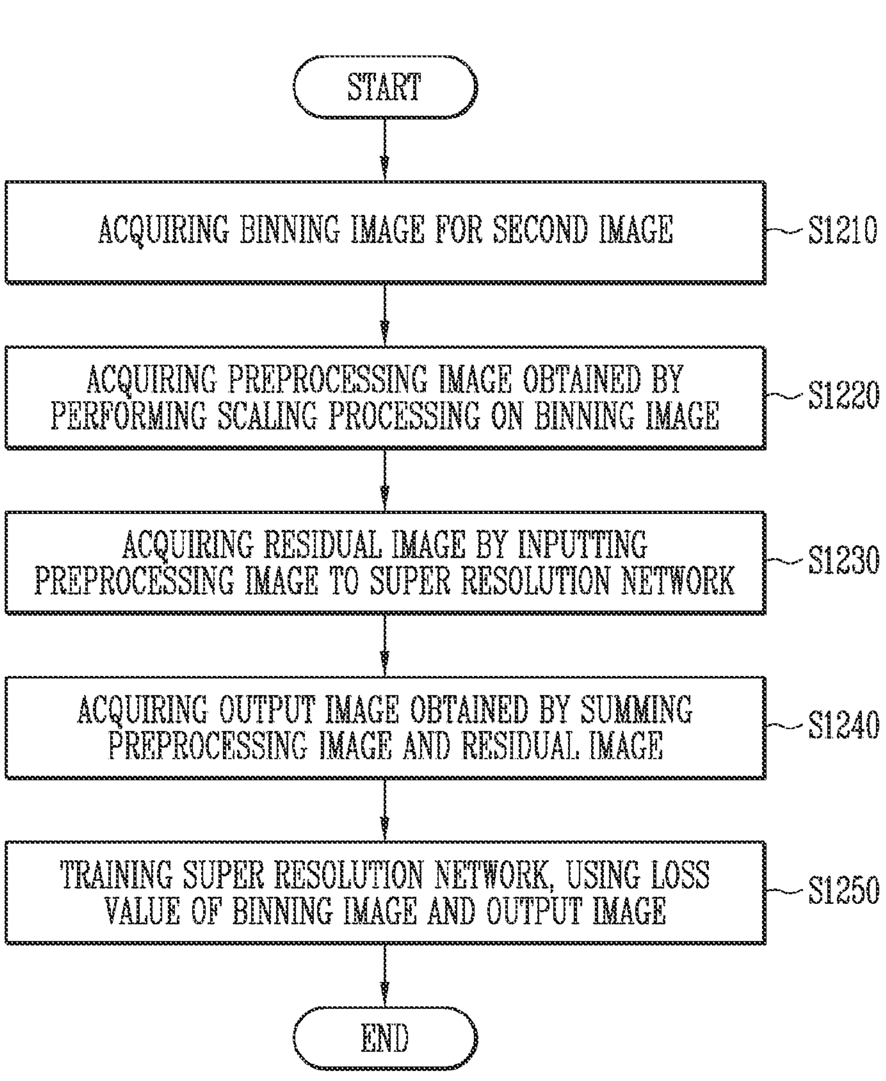

FIG. 12 is a diagram illustrating a training method of the super resolution network in accordance with an embodiment of the present disclosure.

Figure 13:
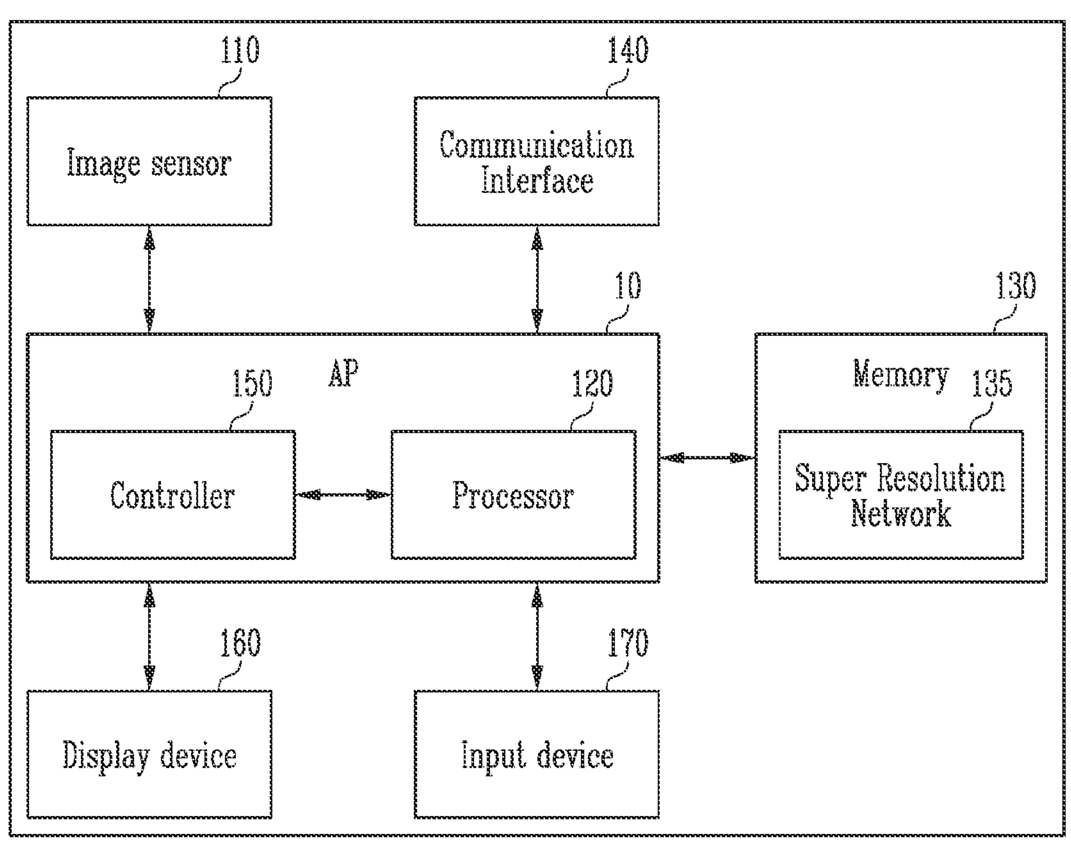

FIG. 13 is a diagram illustrating an implementation example of the image processing device in accordance with an embodiment of the present disclosure.

DETAILED DESCRIPTION

The specific structural or functional description disclosed herein is merely illustrative for the purpose of describing embodiments according to the concept of the present disclosure. The embodiments according to the concept of the present disclosure can be implemented in various forms, and cannot be construed as limited to the embodiments set forth herein.

Embodiments provide an image processing device and an image processing method, which generate a super resolution image.

FIG. 1 is a diagram illustrating an image processing device and a training device in accordance with an embodiment of the present disclosure.

Referring to FIG. 1, the image processing device 100 and the training device 200 may perform communication through a network. The training device 200 may train a super resolution network 135 and may provide the super resolution network 135 to the image processing device 100. The image processing device 100 may generate a super resolution image by using the provided super resolution network 135.

The image processing device 100 may be at least one of various electronic systems configured to acquire an image or picture of an external object, such as smartphones, tablets, black boxes, and automotive electrical systems. Alternatively, the image processing device 100 may be an electronic component included in the above-described electronic systems. For example, the image processing device 100 may be a processing device including an Image Signal Processor (ISP), a Digital Signal Processor (DSP), a Graphics Processing Unit (GPU), a Central Processing Unit (CPU), and the like.

The training device 200 may train a super resolution network 235 by using an image. For example, the training device 200 may be a server, a data center, a cloud server, a workstation, a neural network training device, a computing device of a manufacturer, or the like. However, this is merely an embodiment, and the training device 200 may be an electronic device of the same kind as the image processing device 100.

In an embodiment, the image processing device 100 may include at least one of a first image sensor 110, a processor 120, a memory 130, and a communication interface 140. The training device 200 may include at least one of a second image sensor 210, a network training unit 220, a memory 230, a communication interface 240, and a database 250.

The first and second image sensor 110 and 210 may acquire an image by sensing an optical signal. The optical signal may be a signal of light reflected from an object. To this end, each of the first and second image sensors 110 and 210 may be implemented as a Charge Coupled Device (CCD) sensor, a Complementary Metal Oxide Semiconductor (CMOS) sensor, or the like. Each of the first and second image sensors 110 and 210 may include a plurality of pixels. Each of the plurality of pixels may acquire pixel data by sensing an optical signal. An image may include pixel data. The pixel data may include a pixel value and color information, which correspond to an optical signal sensed by each pixel.

Meanwhile, the first image sensor 110 may be an image sensor of a type different from a type of the second image sensor 210. For example, the first image sensor 110 and the second image sensor 210 may be image sensors having different structures of a microlens. This will be described in detail with reference to FIGS. 3A to 3C.

The processor 120 may control an operation of hardware included in the image processing device 100 or may perform an operation on data. For example, the processor 120 may be configured as one of an Image Signal Processor (ISP), a Digital Signal Processor (DSP), an Application Processor (AP), a Graphics Processing Unit (GPU), a Central Processing Unit (CPU), an Artificial Intelligence (AI), an accelerator, a Neural Processing Unit (NPU), and the like, or any combination thereof.

The memory 130 or 230 may store data. The data may be an image or the super resolution network 135 or 235. For example, the memory 130 or 230 may be implemented as at least one hardware, among a flash memory, a Hard Disk Drive (HDD) or a Solid State Drive (SSD), a Random Access Memory (RAM), a Read Only Memory (ROM), and the like.

The communication interface 140 or 240 may transmit/receive data. For example, the communication interface 140 or 240 may transmit/receive various information by using a communication regulation (protocol) including a Transmission Control Protocol/Internet Protocol (TCP/IP), a User Datagram Protocol (UDP), a Hyper Text Transfer Protocol (HTTP), a Secure Hyper Text Transfer Protocol (HTTPS), a File Transfer Protocol (FTP), a Secure File Transfer Protocol (SFTP), a Message Queuing Telemetry Transport (MQTT) protocol, and the like.

The database 250 may store second images acquired by the second image sensor 210. The second images stored in the database 250 may be used as training data for training the super resolution network 235. Meanwhile, although a case in which the database 250 is included in the training device 200 is illustrated in FIG. 1, this is merely an embodiment, and the database 250 may be implemented as an external device of the training device 200.

The processor 120 may generate a residual image of an input image by using the super resolution network 135 and may generate a super resolution image by using the residual image together with the input image. The input image may be an image generated based on a first image acquired by the first image sensor 110.

The super resolution network 135 or 235 may be a neural network model trained according to a transfer training method. The transfer training method may represent a method of training such that a neural network is used in an environment different from a training environment of the neural network. For example, the super resolution network 135 may be implemented in a form including a CNN-based Very Deep Super Resolution (VDSR) network, Enhanced Deep Residual Networks for Single Image Super Resolution (EDSR), a Deeply Recursive Convolution Network (DRCN), a Multi-scale Deep Super Resolution (MDSR) system, and the like.

The super resolution network 135 or 235 may be a neural network model trained using second images. The second image may be an image acquired by the second image sensor 210. The super resolution network 235 may be trained by the network training unit 220. For example, the network training unit 220 may be implemented as one of a Graphics Processing Unit (GPU), a Central Processing Unit (CPU), an Artificial Intelligence (AI), an accelerator, a Neural Processing Unit (NPU), and the like.

The communication interface 240 may transmit the super resolution network 235 which has been completely trained to the image processing device 100. The image processing device 100 may store the super resolution network 235 received through the communication interface 140 as the trained super resolution network 135 in the memory 130. Meanwhile, although a case in which the second image sensor 210 is included in the training device 200 has been described in FIG. 1, this is merely an embodiment, and the second image sensor 210 may be implemented as an external device of the training device 200.

In the above-described embodiment, it has been described that the image processing device 100 and the training device 200 are devices separate from each other. However, this is merely an embodiment, and a case in which the image processing device 100 and the training device 200 are integrated into one electronic device may be modified and embodied. For example, the image processing device 100 may be modified in various forms, such as the image processing device 100 including the first image sensor 110, the processor 120, the memory 130, and the network training unit 220.

FIG. 2 is a diagram illustrating an image sensor in accordance with an embodiment of the present disclosure.

Referring to FIG. 2, a first image sensor 110 may acquire an image IMG by photographing an object. Meanwhile, descriptions of the first image sensor 110 with reference to FIG. 2 may be commonly applied to the second image sensor 210 shown in FIG. 1.

The first image sensor 110 may include an optical lens LS, a pixel array 111, a row decoder 112, a timing generator 113, a signal transducer 114, and an output buffer 115.

The optical lens LS may refract incident light. The light refracted through the optical lens LS may be transferred to the pixel array 111. To this end, the optical lens LS may include at least one of a convex lens or a concave lens.

The pixel array 111 may include a plurality of pixels. The plurality of pixels may be arranged in row and column directions. The arrangement of the pixels of the pixel array 111 may be identical to an arrangement of pixel values of the image IMG.

The row decoder 112 may select pixels for reading pixel values under the control of the timing generator 113. For example, the row decoder 112 may select pixels of a row corresponding to an address, among the plurality of pixels included in the pixel array 111, in response to the address and control signals, which are output from the timing generator 113.

The timing generator 113 may control the row decoder 112 and a signal transducer 114 to read pixel values from pixels of a specific row in the pixel array 111. For example, the timing generator 113 may sequentially output a row address, representing pixels located on a specific row of the pixel array 111, to the row decoder 112 to output pixel signals that the pixels of the specific row sense for an exposure time.

The signal transducer 114 may acquire pixel values by using pixel signals received from the pixel array 111 and a row address received from the timing generator 113. For example, the pixel signal may be a voltage. The signal transducer 114 may include an analog-digital converter. Also, the signal transducer 114 may transfer the pixel values to the output buffer 115.

The output buffer 115 may be connected to the signal transducer 114 through a plurality of column lines. The output buffer 115 may sequentially store pixel values of a row unit, which are received from the signal transducer 114. When pixel values of all rows are stored, the output buffer 115 may output one image IMG including the stored pixel values.

FIG. 3A is a diagram illustrating a first image sensor in accordance with an embodiment of the present disclosure. In FIG. 3A, a pixel region 311*b* may be a region obtained by enlarging a pixel region 311*a*, and a pixel section 313*b* may represent a section of a pixel pair 313*a*.

Referring to FIG. 3A, the first image sensor 310 may include a plurality of pixels. The plurality of pixels may include a red pixel R, a green pixel G, and a blue pixel B. The red pixel R, the green pixel G, and the blue pixel B may be sorted according to a color filter CF. The color filter CF may allow light of a specific color (or wavelength) to be transmitted therethrough.

The plurality of pixels may be arranged according to a quad Bayer pattern. The quad Bayer pattern may represent an arrangement in which pixels of the same color, among the red pixel R, the green pixel G, and the blue pixel B, are arranged in 2×2 in a unit of the pixel region 311*b*. For example, the pixel region 311*b* may include a first unit region 312*a* located at (1, 1), a second unit region 312*b* located at (1, 2), a third unit region 312*c* located at (2, 1), and a fourth unit region 312*d* located at (2, 2). The green pixel G may be arranged in 2×2 in each of the first unit region 312*a* and the fourth unit region 312*d*. The red pixel R may be arranged in 2×2 in the second unit region 312*b*. The blue pixel B may be arranged in 2×2 in the third unit region 312*c*.

In an embodiment, pixels included in the first image sensor 110 may be phase detection pixels 314*a* and 314*b*. The phase detection pixels 314*a* and 314*b* may include a microlens ML1 and photodiodes PD disposed under the microlens ML1. A first phase detection pixel 314*a* may be a pixel having a structure in which the first phase detection pixel 314*a* shares the microlens with an adjacent second phase detection pixel 314*b*. That is, a plurality of photodiodes PD may be located under one microlens ML. The microlens ML1 may refract light. The photodiode may sense an intensity (or brightness) of incident light.

The microlens ML1 may have a size for covering photodiodes PD adjacent to each other. The size may represent a width or a length on a plane on which a plurality of pixels are arranged. For example, a length ms1 of the microlens ML1 may be equal to a sum of the lengths ps1*a* and ps1*b* of a plurality of photodiodes PD. In an embodiment, each microlens ML1 included in the first image sensor 110 may cover photodiodes PD of 2×2. However, this is merely an embodiment, and the microlens ML1 may be modified and embodied to have various sizes for covering photodiodes PD of 2×1, 1×2, 3×3, and the like. That is, the length ms1 of the microlens ML1 may be in proportion to the number of photodiodes covered by the microlens ML1.

In an embodiment, the phase detection pixel 314*a* and 314*b* may further include a color filter CF disposed between the microlens ML1 and the photodiode PD.

FIG. 3B is a diagram illustrating a second image sensor in accordance with an embodiment of the present disclosure. In FIG. 3B, a pixel region 321*b* may be a region obtained by enlarging a pixel region 321*a*, and a pixel section 323*b* may represent a section of a pixel pair 323*a*.

Referring to FIG. 3B, the second image sensor 320 may include a plurality of pixels. The plurality of pixels may include a red pixel R, a green pixel G, and a blue pixel B. The plurality of pixels may be arranged according to a quad Bayer pattern. This may be applied identically to the first image sensor 310 shown in FIG. 3A. In descriptions of the second image sensor 320, portions overlapping with those of the first image sensor 310, shown in FIG. 3A, will be omitted.

In an embodiment, pixels included in the second image sensor 320 may be normal pixels 324*a* and 324*b*. The normal pixels 324*a* and 324*b* may include microlenses ML2*a* and ML2*b* and photodiodes PD. For example, one microlens ML2*a* or ML2*b* may be disposed above each photodiode PD. Each microlens ML2*a* or ML2 may have a size for covering a corresponding photodiode PD. For example, a length ms2*a* of a microlens ML2*a* of a first normal pixel 324*a* may be equal to a length ps2*a* of a photodiode PD of the first normal pixel 324*a*, and a length ms2*b* of a microlens ML2*b* of a second normal pixel 324*b* may be equal to a length ps2*b* of a photodiode PD of the second normal pixel 324*b*.

Meanwhile, although a case in which the pixel arrangement of each of the first image sensor 310 and the second image sensor 320 is the quad Bayer pattern in which pixels of the same color are arrange in 2×2 in each unit region has been described in FIGS. 3A and 3B, this is merely an embodiment, and the pixel arrangement may be modified and embodied in various patterns. For example, pixels of the same color may be arranged in 3×3, 4×4, 2×3, 3×2, and the like in each unit region. The arrangements of the pixels of the first image sensor 310 and the second image sensor 320 may be the same. Hereinafter, for convenience of description, a case in which each of the first image sensor 310 and the second image sensor 320 include pixels arranged according to the quad Bayer pattern will be assumed and described.

FIG. 3C is a diagram illustrating images acquired through the image sensors in accordance with an embodiment of the present disclosure.

Referring to FIGS. 3A to 3C, a first image 330 may represent a portion of an image acquired through the first image sensor 310, and a second image 340 may represent a portion of an image acquired through the second image sensor 320. Each of the first image 330 and the second image 340 may include a pixel value of a red color (hereinafter, referred to as a red pixel value), a pixel value of a green color (hereinafter, referred to as a green pixel value), and a pixel value of a blue color (hereinafter, referred to as a blue pixel value). The pixel values may represent brightness of light.

In accordance with an embodiment, even when the first image 330 and the second image 340 are photographed in the same environment, a region having a larger pixel value in the opposite direction of an arrow of the second image 340 may exist in the first image 330. That is, a region in which a pixel value is reversed may exist in the first image 330. This may be because, like the phase detection pixels 314*a* and 314*b* included in the first image sensor 310, optical distortion may occur due to a structure in which a plurality of photodiodes share one microlens. In the present disclosure, the reversal of a pixel value can be prevented using a super resolution network. This will be described in detail later.

FIG. 4 is a diagram illustrating a configuration of a network training unit and a processor in accordance with an embodiment of the present disclosure.

Referring to FIG. 4, the network training unit 220 may include a binning processor 221 and a training unit 225. The processor 120 may include a binning processor 121 and a super resolution image acquirer 125.

The binning processor 121 or 221 may perform a binning operation on a respective first or second image 411 or 421 acquired by a respective first or second image sensor 410 or 420. The first image sensor 410 may include a plurality of phase detection pixels, and the second image sensor 420 may include a plurality of normal pixels. The binning operation may be an operation of converting pixel values that have the same color and are disposed at adjacent positions, among pixel values included in an image, into one pixel value. For example, the binning processor 121 or 221 may perform a binning operation of converting pixel values included in each of a plurality of unit regions included in the first or second image 411 or 421 into one pixel value. Each unit region may be a region including pixel values of the same color.

The binning processor 121 or 221 may acquire a first or second binning image 413 or 423, respectively, based on the respective first or second image 411 or 421 as a result of performing the binning operation. The first or second binning image 413 or 423 may be a smaller version of the first or second image 411 or 421, respectively, and the relationship between the first or second binning image 413 or 423 and the first or second image 411 or 421 may be measured based on an image scale. The scale may represent a number of pixel values in a lateral direction and a number of pixel values in a longitudinal direction, among pixel values included in an image.

The training unit 225 may train the super resolution network 235 by using the second binning image 423 based on the second image sensor 420. The training may be a process of searching for an optimum value for each of a plurality of filters included in the super resolution network 235. The training unit 225 may update and store each of the filters of the super resolution network 235 according to repeated training.

The super resolution image acquirer 125 may acquire a super resolution image 419 from the trained super resolution network 135 by using the first binning image 413 based on the first image sensor 410. For example, the super resolution image acquirer 125 may input an upscale image of the first binning image 413 to the trained super resolution network 135 and may acquire the super resolution image 419 as output data output from the super resolution network 135.

In accordance with an embodiment of the present disclosure, a super resolution image of the first image 411 acquired by the first image sensor 410 may be generated using the super resolution network 135 trained based on the second image 421 acquired by the second image sensor 420. In particular, the super resolution network 135 may be trained through second images acquired by the second image sensor 420, the second image sensor 420 being different from the first image sensor 410. That is, the super resolution network 135 may be trained using a domain transfer method. Accordingly, the super resolution image 419 can be generated, in which a phase difference in all regions of the image can be detected, and the reversal of a pixel value according to the phase difference can be prevented.

FIG. 5 is a diagram illustrating an operation of a binning processor in accordance with an embodiment of the present disclosure.

Referring to FIGS. 4 and 5, the binning processor 121 or 221 may acquire a binning image 513 for an image 511. The image 511 may represent a portion of the first image 411 or the second image 421, and the binning image 513 may represent a portion of the first binning image 413 or the second binning image 423.

The image 511 may include a plurality of unit regions. The unit region may be a region including pixel values that have the same color and are disposed at adjacent positions. For example, the image 511 may include a first unit region 511A. The first unit region 511A may include pixel values gr1 to gr4 of a green color, which are disposed at adjacent positions.

In an embodiment, the binning processor 121 or 221 may sum the pixel values gr1 to gr4 included in the first unit region 511A. The binning processor 121 or 221 may acquire the summed value as a pixel value Gr for a first unit region 513A of the binning image 513.

In another embodiment, the binning processor 121 or 221 may acquire an average value of the pixel values gr1 to gr4 included in the first unit region 511A of the image 511 as the pixel value Gr for the first unit region 513A of the binning image 513 through an average operation.

As described above, the same operation may be repeatedly performed on each of other unit regions. As a result, the binning processor 121 or 221 may acquire the binning image 513 including pixel values for each of a plurality of regions. The image 511, before a binning operation is performed, may be an image of a quad Bayer pattern, and the binning image 513, acquired as a result of performing the binning operation, may be an image of a Bayer pattern. In accordance with the present disclosure, pixel values included in a unit region are converted into one pixel value through the binning operation so that optical distortion can be cancelled.

FIG. 6 is a diagram illustrating a detailed configuration of the network training unit in accordance with an embodiment of the present disclosure. FIG. 7 is a diagram illustrating a training operation of the network training unit in accordance with an embodiment of the present disclosure.

Referring to FIGS. 6 and 7, the network training unit 220 may include a binning processor 221, a scaler 223, and a training unit 225.

The binning processor 221 may perform a binning operation, thereby acquiring a second binning image 713 for a second image. The second image may be an image acquired by a second image sensor including normal pixels.

The scaler 223 may perform preprocessing on the second binning image 713, thereby acquiring a preprocessing image. For example, the preprocessing may be scale conversion processing.

The scaler 223 may include a downscaler 223*a* and an upscaler 223*b*.

The downscaler 223*a* may perform downscaling processing on the second binning image 713, thereby acquiring a downscale image 714. The downscaling processing may be performed using algorithms of various methods including a down-sampling method, a Gaussian pyramid method, a sub-sampling method, and the like. For example, the downscale image 714 may have a scale that is half a scale of the second binning image 713.

The upscaler 223*b* may perform upscaling processing on the downscale image 714, thereby acquiring an upscale image 715. The upscaling processing may be performed using various interpolation processing methods including bilinear, bicubic, Lanczos, spline, and the like. For example, the upscale image 715 may have a scale that is twice the scale of the downscale image 714. The upscale image 715 may be the above-described preprocessing image. That is, the preprocessing image may be an image obtained by sequentially performing downscaling processing and upscaling processing on the second binning image 713. Consequently, the upscale image 715 may have the same scale as the second binning image 713.

The training unit 225 may train the super resolution network 235 by using the upscale image 715 and the second binning image 713. The quality of the upscale image 715 may be deteriorated as compared with that of the second binning image 713. The training of the super resolution network 235 may target improving the quality of the upscale image 715 to reach the quality of the second binning image 713.

In an embodiment, the training unit 225 may include a residual image acquirer 225*a*, an image summer 225*b*, a loss value calculator 225*c*, and a filter adjuster 225*d*.

The residual image acquirer 225*a* may input the upscale image 715 to the super resolution network 235. As a result, the residual image acquirer 225*a* may acquire a residual image 717 output from the super resolution network 235. The residual image 717 may be an image output from the super resolution network 235 in which the preprocessing image is input. For example, the preprocessing image may be the upscale image 715. The residual image 717 may be an image for correcting the upscale image 715.

The image summer 225*b* may acquire a super resolution image 719 obtained by summing the upscale image 715 and the residual image 717. For example, the image summer 225*b* may sum pixel values corresponding to each other among pixel values included in the upscale image 715 and the residual image 717. The image summer 225*b* may acquire the super resolution image 719 including the summed pixel values.

The loss value calculator 225*c* may apply pixel values corresponding to each other, among pixel values included in the super resolution image 719 and the second binning image 713, to a loss function, thereby acquiring loss value 720. The loss value 720 represents a value obtained by digitizing an error with respect to the super resolution image 719 and the second binning image 713. For example, the loss function may be one of various functions including a Mean Squared Error (MSE), a Cross Entropy Error (CEE), and the like.

The filter adjuster 225*d* may train the super resolution network 235 such that the loss value 720 is minimized. For example, the filter adjuster 225*d* may train the upper resolution network 235 through a back-propagation method. In an embodiment, the filter adjuster 225*d* may repeatedly perform training until the loss value 720 becomes a threshold value or less. The super resolution network 235 that has completely trained may be provided to the image processing device 100.

FIG. 8A is a diagram illustrating a super resolution network in accordance with an embodiment of the present disclosure.

Referring to FIG. 8A, the super resolution network 235 may include a plurality of layers connected in series. The plurality of layers being connected in series may mean that an output of one layer may be connected to an input of a next layer. The plurality of layers may include convolution layers Conv1 to ConvN and activation map layers AM1 to AMN. Meanwhile, in some embodiments, numbers of the convolution layers Conv1 to ConvN and the activation map layers AM1 to AMN may be variously changed.

Meanwhile, an input of a first layer, among the plurality of layers included in the super resolution network 235, may be a preprocessing image. For example, the preprocessing image may be an upscale image. An output of a last layer, among the plurality of layers included in the super resolution network 235, may be a residual image.

Each of the convolution layers Conv1 to ConvN may include at least one filter. The filter may include a plurality of weight parameters. For example, the filter may include a plurality of values configured in a matrix. The value included in the filter may be a weight parameter. Meanwhile, at least one of the plurality of weight parameters may be updated through training.

Filter information 237 may include information on filters included in each of the convolution layers Conv1 to ConvN. The filter information 237 may include a weight parameter of the filter. The filter information 237 may be stored in the memory 230. The memory 230 may store the filter information 237 updated based on training.

In an embodiment, referring to FIGS. 7 and 8A, the filter adjuster 225*d* may back-propagate the loss value 720, acquired based on the super resolution image 719 and the second binning image 713, to the super resolution network 235, thereby training at least one of the filters included in the convolution layers Conv1 to ConvN. The filter adjuster 225*d* may train the filter such that the loss value 720 becomes small. For example, the filter adjuster 225*d* may input the loss value 720 to an output node of the super resolution network 235, thereby determining a weight parameter having high importance for the loss value 720 among weight parameters connected to nodes in each of the convolution layers Conv1 to ConvN. The filter adjuster 225*d* may update a value of the determined weight parameter to another value.

Hereinafter, one convolution layer, among the convolution layers Conv1 to ConvN, will be described with reference to FIG. 8B, and one activation map layer, among the activation map layers AM1 to AMN, will be described with reference to FIG. 8C.

FIG. 8B is a diagram illustrating a convolution layer in accordance with an embodiment of the present disclosure.

Referring to FIG. 8B, the convolution layer 840 may include a filter 845. The filter 845 may include weight parameters w1 to w9 arranged in row and column directions. Each of the weight parameters w1 to w9 may be updated based on training. An operation performed in the convolution layer Conv 840 may be an operation performed in the training unit 225.

The convolution layer 840 may acquire padding data 830 when input data 820 is input. When the convolution layer 840 is a first layer, the input data 820 may be a preprocessing image of a second image or an upscale image of a first mage. The input data 820 may be data output from a previous layer of the convolution layer 840 when the convolution layer 840 is not the first layer. The padding data 830 may represent data obtained by performing padding processing on the input data 820 to maintain a size of output data output as a convolution operation result to be equal to a size of the input data 820. For example, the padding data 830 may be data obtained by adding a value of 0 at an outer position of values x1 to x4 of the input data 820.

The convolution layer 840 may acquire a convolution map 850 by using the padding data 830 and the filter 845. The convolution map 850 may include convolution values y1 to y4 acquired as a result of performing a convolution operation using a value of the padding data 830 and a weight parameter of the filter 845.

Specifically, the convolution layer 840 may allow the filter 845 to overlap with a first region 831 of the padding data 830. The convolution layer 840 may perform a convolution operation by using overlapped values. For example, the convolution layer 840 may acquire a value y1 obtained by summing values obtained by multiplying a pixel value and a weight parameter. For example, the pixel value may correspond to a value at the same position, among values 0 to x4 included in the first region 831, and the weight parameter may correspond to the weight parameters w1 to w9 of the filter 845. The multiplication of the pixel value and the weight parameter may result in a first convolution value y1 with respect to a first position 851 corresponding to the first region 831. Also, the convolution layer 840 may move the filter 845 in a row or column direction in the first region 831 of the padding data 830 and may perform a convolution operation by using overlapped values. Through this manner, the convolution layer 840 may acquire each of the other convolution values y2, y3, and y4.

FIG. 8C is a diagram illustrating an activation map layer in accordance with an embodiment of the present disclosure.

Referring to FIG. 8C, the activation map layer 870 may include an activation function. The activation function may be, for example, one of a Sigmoid function, a Tanh function, a Rectified Linear Unit (ReLU) function, a leaky ReLU function, an Exponential Linear Unit (ELU) function, and a maxout function.

The activation map layer 870 may acquire an activation map 880 when input data 860 is input. The activation map 880 may include values z1 to z4 calculated by applying the activation function to each of values y1 to y4 included in the input data 860. The input data 860 may be output data of a previous layer of the activation map layer 870. The previous layer may be one of the convolution layers.

Meanwhile, the super resolution network 235 described in FIGS. 8A to 8C may be applied identically to the trained super resolution network 135.

FIG. 9 is a diagram illustrating a detailed configuration of the processor in accordance with an embodiment of the present disclosure. FIG. 10 is a diagram illustrating a deduction operation of the processor in accordance with an embodiment of the present disclosure.

Referring to FIGS. 9 and 10, in an embodiment, the processor 120 may include a binning processor 121, a scaler 123, and a super resolution image acquirer 125.

The binning processor 121 may perform a binning operation, thereby acquiring a first binning image 1013 for a first image. The first image may be an image acquired by the first image sensor including the phase detection pixels. Meanwhile, detailed descriptions of the binning processor 121 overlap with the description of FIG. 6, and therefore, will be omitted.

The scaler 123 may perform preprocessing on the first binning image 1013, thereby acquiring a preprocessing image.

In an embodiment, the preprocessing may be upscaling processing. The preprocessing image may be an upscale image 1015. The upscale image 1015 may have a scale that is twice a scale of the first binning image 1013. A specific example will be described. When a scale of pixel values included in the first binning image 1013 is 300×300, a scale of pixel values included in the upscale image 1015 may be 600×600. Meanwhile, detailed descriptions of the scale 123 overlap with those described above in FIG. 6, and therefore, will be omitted.

The super resolution image acquirer 125 may acquire a super resolution image 1019 from the upscale image 1015 through the super resolution network 135.

In an embodiment, the super resolution image acquirer 125 may include a residual image acquirer 125*a* and an image summer 125*b*.

The residual image acquirer 125*a* may input the upscale image 1015 to the trained super resolution network 135. As a result, the residual image acquirer 125*a* may acquire a residual image 1017 output from the trained super resolution network 135. The residual image 1017 may be an image for correcting the upscale image 1015. For example, the residual image acquirer 125*a* may perform a convolution operation using a filter in a layer included in the trained super resolution network 135, thereby acquiring the residual image 1017 for the upscale image 1015. The filter may include a weight parameter updated through the above-described training process.

The image summer 125*b* may acquire the super resolution image 1019 by summing the upscale image 1015 and the residual image 1017. Descriptions of this overlap with those described above in FIG. 6, and therefore, will be omitted.

FIG. 11 is a diagram illustrating an image processing method in accordance with an embodiment of the present disclosure.

Referring to FIG. 11, the image processing method may include step S1110 of acquiring a first image through a first image sensor and step S1130 of outputting a super resolution image for the first image through a super resolution network trained using second images acquired by a second image sensor, the second image sensor being different from the first image sensor. A type of the second image sensor may be different from a type of the first image sensor. The first image sensor may include a plurality of phase detection pixels, and the second image sensor may include a plurality of normal pixels. The image processing method of the present disclosure may be performed by the above-described image processing device 100.

In an embodiment, step S1130 of outputting the super resolution image for the first image may include step S1131 of acquiring a binning image for the first image, step S1133 of acquiring an upscale image for the binning image, step S1135 of acquiring a residual image by inputting the upscale image to the super resolution network, and step S1137 of acquiring a super resolution image obtained by summing the upscale image and the residual image.

In step S1131 of acquiring the binning image, a binning image may be acquired by performing a binning operation on the first image. For example, pixel values that have the same color and are disposed at adjacent positions, among pixel values included in the first image, may be converted into one pixel value, and a binning image including the converted pixel values may be acquired.

In step S1133 of acquiring the upscale image, an upscale image may be acquired by performing upscaling processing on the binning image. For example, the upscale image may have a scale that is twice a scale of the binning image.

In step S1135 of acquiring the residual image, a residual image may be acquired by performing a convolution operation on a filter included in the super resolution network and the upscale image.

In step S1137 of acquiring the super resolution image, pixel values corresponding to each other among pixel values included in the upscale image and the residual image may be summed, and a super resolution image including the summed pixel values may be acquired.

FIG. 12 is a diagram illustrating a training method of the super resolution network in accordance with an embodiment of the present disclosure.

Referring to FIG. 12, the training method of the super resolution network may include step S1210 of acquiring a binning image for a second image, step S1220 of acquiring a preprocessing image obtained by performing scaling processing on the binning image, step S1230 of acquiring a residual image by inputting the preprocessing image to the super resolution network 235, step S1240 of acquiring an output image obtained by summing the preprocessing image and the residual image, and step S1250 of training the super resolution network by using a loss value of the binning image and the output image. The training method of the present disclosure may be performed by the above-described image processing device 100 or the above-described training device 200.

In step S1210 of acquiring the binning image, a binning image may be acquired by performing a binning operation on a second image. The second image may be acquired by a second image sensor including a plurality of normal pixels.

In step 1220 of acquiring the preprocessing image, a preprocessing image may be acquired by performing scaling conversion processing on the binning image. The preprocessing may include downscaling processing and upscaling processing. That is, the preprocessing image may be an image obtained by sequentially performing the downscaling processing and the upscaling processing on the binning image. The preprocessing image may be an image having the same scale as the binning image.

In step S1230 of acquiring the residual image, an image output as a result of inputting the preprocessing image to a super resolution network may be acquired as a residual image.

In step S1240 of acquiring the output image, an output image may be acquired by summing the preprocessing image and the residual image. Each pixel value included in the output image may be a value obtained by summing pixel values corresponding to each other, which are respectively included in the preprocessing image and the residual image.

In step S1250 of training the super resolution network, the super resolution network may be trained by using a loss value of the binning image and the output image. The loss value may be acquired by applying pixel values having the same position relationship among pixel values included in the binning image and pixel values included in the output image to a loss function. A weight parameter of a filter included in the super resolution network is adjusted such that the loss value is minimized, thereby training the super resolution network.

FIG. 13 is a diagram illustrating an implementation example of the image processing device in accordance with an embodiment of the present disclosure.

Referring to FIG. 13, the image processing device 100 may include an Application process (AP) 10, an image sensor 110, a memory 130, a communication interface 140, a display device 160, and an input device 170.

The AP 10 may include at least one of a Central Processing Unit (CPU), an Application Processing Unit (APU), a Graphic Processing Unit (GPU), and the like. To communicate, the AP 10 may be connected to the image sensor 110, the communication interface 140, the memory 130, the display device 160, and the input device 170 through an address bus, a control bus, and a data bus. To this end, the AP 10 may be connected to an expansion bus such as a Peripheral Component Interconnect (PCI) bus.

In accordance with an embodiment, the AP 10 may include a processor 120 and a controller 150. The processor 120 may be implemented as an Image Signal Processor (ISP), a Digital Signal Processor (DSP), a CPU, a GPU, an NPU, or the like. Descriptions of the processor 120 may overlap with those of the above-described process, and therefore, will be omitted. The controller 150 may control overall operations of the image processing device 100. The controller 150 may control each component of the image processing device 100. For example, the controller 150 may control the image sensor 110 to acquire an image. The controller 150 may control the display device 160 to display an image. The controller 150 may control the communication interface 140 to perform communication with an external device. The controller 150 may control the memory 130 to store an image or data or to read an image or data.

The memory 130 may store a super resolution network 135. The memory 130 may store data including an image, an instruction, and the like. In an embodiment, the memory 130 may include a volatile memory device, such as s Dynamic Random Access Memory (DRAM) or a Static Random Access Memory (SRAM). In an embodiment, the memory 130 may include a nonvolatile memory device, such as a flash memory device, a Solid State Drive (SSD), a Hard Disk Drive (HDD), or an optical disk.

The display device 160 may be a device for visually displaying an image. To this end, the display device 160 may be implemented with various types of displays, such as a Liquid Crystal Display (LCD) that uses a separate backlight unit (e.g., a light emitting diode (LED) or the like) as a light source and controls an molecular arrangement of liquid crystals, thereby adjusting a degree (brightness or intensity of light) to which light emitted from the backlight unit is transmitted through the liquid crystals, and a display that uses a self-luminous element (e.g., a mini LED having a size of 100 to 200 μm, a micro LED having a size of 100 μm or less, an Organic LED (OLED), a Quantum dot LED (QLED), or the like) as a light source without any separate backlight unit or any liquid crystals. The display device 160 may allow lights of red, green, and blue colors corresponding to an output image to be emitted to the outside.

The display device 160 may display an image or a super resolution image on a display.

The input device 170 may be a device capable of inputting a command of a user through an interaction. For example, the input device 170 may be implemented as a keyboard, a keypad, a mouse, a microphone, a remote controller, a button or the like.

In accordance with the present disclosure, an image processing device and an image processing method may generate a super resolution image. Accordingly, a phase difference can be detected in all regions of an image, and the reversal of a pixel value according to the phase difference can be prevented.

While the present disclosure has been shown and described with reference to certain exemplary embodiments thereof, it will be understood by those skilled in the art that various changes in form and details may be made therein without departing from the spirit and scope of the present disclosure as defined by the appended claims and their equivalents. Therefore, the scope of the present disclosure should not be limited to the above-described exemplary embodiments but should be determined by not only the appended claims but also the equivalents thereof.

In the above-described embodiments, all steps may be selectively performed or part of the steps and may be omitted. In each embodiment, the steps might not necessarily be performed in accordance with the described order and may be rearranged. The embodiments disclosed in this specification and drawings are only examples to facilitate an understanding of the present disclosure, and the present disclosure is not limited thereto. That is, it should be apparent to those skilled in the art that various modifications can be made on the basis of the technological scope of the present disclosure.

Meanwhile, the exemplary embodiments of the present disclosure have been described in the drawings and specification. Although specific terminologies are used here, those are only to explain the embodiments of the present disclosure. Therefore, the present disclosure is not restricted to the above-described embodiments and many variations are possible within the spirit and scope of the present disclosure. It should be apparent to those skilled in the art that various modifications can be made on the basis of the technological scope of the present disclosure in addition to the embodiments disclosed herein.

What is claimed is:

1. An image processing device comprising:

a memory configured to store a super resolution network trained to output a corrected image based on an input image; and a processor configured to output a super resolution image based on a first image acquired by a first image sensor and a corrected image output from the super resolution network, wherein the super resolution network is a model trained by using second images acquired through a second image sensor, wherein a type of the second image sensor is different from a type of the first image sensor, wherein the first image sensor includes only sets of phase detection pixels, each of the set includes a first microlens and photodiodes disposed under the first microlens, wherein the first microlens is shared with phase detection pixels included in one of the sets, and wherein the second image sensor includes a plurality of normal pixels, each of the plurality of normal pixels includes a second micro lens and a photodiode.

2. The image processing device of claim 1, wherein the first microlens refracts light and the photodiodes sense intensities of light refracted through the first microlens, and wherein the first microlens has a size for covering the photodiodes which include a photodiode and at least one photodiode adjacent to the photodiode.

3. The image processing device of claim 1, wherein the second microlens refracts light and the photodiode senses an intensity of light refracted through the second microlens, and wherein the second microlens has a size for covering the photodiode.

4. The image processing device of claim 1, wherein the processor acquires a binning image obtained by performing binning processing on pixel values included in the first image, acquires an upscale image for the binning image, and acquires the super resolution image by using the super resolution network.

5. The image processing device of claim 4, wherein the first image includes a plurality of unit regions, and each of the plurality of unit regions includes pixel values of the same color, and wherein the processor includes a binning processor configured to acquire the binning image including a plurality of average pixel values corresponding to the plurality of unit regions by performing an average operation on the pixel values included in each of the plurality of unit regions.

6. The image processing device of claim 4, wherein the processor includes a scaler configured to acquire the upscale image by performing interpolation processing on the binning image.

7. The image processing device of claim 4, wherein the super resolution network includes a plurality of filters, and wherein the processor includes a super resolution image acquirer configured to acquire the corrected image by performing a convolution operation, using the upscale image and each of the plurality of filters, and acquire the super resolution image by summing the upscale image and the corrected image.

8. The image processing device of claim 7, wherein a plurality of filters of the super resolution network are updated based on a loss value between a binning image corresponding to a selected second image among the second images, and an output image obtained by summing a preprocessing image and a residual image corresponding to the selected second image, wherein the preprocessing image is an image obtained by performing downscaling processing and upscaling processing, on the binning image, and wherein the residual image is an image output from the super resolution network in which the preprocessing image is input.

9. The image processing device of claim 1, wherein the first image and the second image include pixel values of a red color, pixel values of a green color, and pixel values of a blue color, which are arranged according to a quad Bayer pattern, and wherein the super resolution image includes pixel values of a red color, pixel values of a green color, and pixel values of a blue color, which are arranged according to a quad Bayer pattern.

10. An image processing method comprising:

acquiring a first image through a first image sensor; and acquiring a super resolution image based on the first image through a super resolution network trained using second images acquired by a second image sensor, wherein a type of the second image sensor is different from a type of the first image sensor, wherein the first image sensor includes only sets of phase detection pixels, each of the set includes a first microlens and photodiodes disposed under the first microlens, wherein the first microlens is shared with phase detection pixels included in one of the sets, and wherein the second image sensor includes a plurality of normal pixels, each of the plurality of normal pixels includes a second micro lens and a photodiode.

11. The image processing method of claim 10, further comprising acquiring a binning image including a plurality of average pixel values corresponding to a plurality of unit regions included in the first image by performing an average operation on pixel values included in each of the plurality of unit regions.

12. The image processing method of claim 11, further comprising acquiring an upscale image by performing interpolation processing on the binning image.

13. The image processing method of claim 12, wherein the acquiring of the super resolution image includes:

acquiring a corrected image by performing a convolution operation, using the upscale image and the super resolution network; and acquiring the super resolution image by summing the upscale image and the corrected image.

14. The image processing method of claim 10, further comprising training a plurality of filters included in the super resolution network by using the second images acquired through the second image sensor including a plurality of microlenses each having a size for covering a plurality of photodiodes.

15. The image processing method of claim 14, wherein the training of the plurality of filters includes:

acquiring a preprocessing image for a selected second image, among the second images;

acquiring a residual image by performing a convolution operation based on the preprocessing image and each of the plurality of filters;

acquiring an output image by summing the preprocessing image and the residual image; and updating the plurality of filters based on a loss value of the output image and a binning image for the selected second image.

16. The image processing method of claim 15, wherein the acquiring of the preprocessing image includes:

acquiring the binning image by performing binning processing on the selected second image;

acquiring a downscale image by performing downscaling processing on the binning image; and acquiring, as the preprocessing image, an upscale image by performing upscaling processing on the downscale image.

17. The image processing method of claim 10, further comprising receiving and storing the super resolution network trained in an external device.

18. The image processing method of claim 10, wherein a size of the first microlens is greater than a size of the second microlenses microlens.

19. The image processing method of claim 10, wherein the first image and the second image include pixel values of a red color, pixel values of a green color, and pixel values of a blue color, which are arranged according to a quad Bayer pattern, and wherein the super resolution image includes pixel values of a red color, pixel values of a green color, and pixel values of a blue color, which are arranged according to a quad Bayer pattern.

* * * * *